UNITED STATES PATENT OFFICE.

JAMES PERRY, OF LEEDS, NORTHAMPTON, MASSACHUSETTS.

IMPROVED COMPOSITION FOR FILLING WOOD.

Specification forming part of Letters Patent No. 57,960, dated September 11, 1866.

*To all whom it may concern:*

Be it known that I, JAMES PERRY, of Leeds, Northampton, Hampshire county, Commonwealth of Massachusetts, have invented and discovered a new and useful Method of Filling the Grain and Pores of Wood for Cabinet Purposes; and I do hereby declare that the following is a full and exact description of the same.

This invention consists of the use of a certain clay or marl known to chemists as "silicious marl," or "infusorial earth," in the process of filling the grain of wood to be polished.

The operation is effected in a similar manner to that in which other materials for the same purpose are used—that is, by rubbing the substance well into the pores and grain of the wood, in order to produce a close hard surface capable of being highly finished—rotten-stone and plaster-of-paris being the most common materials used in this process.

Infusorial earth, such as my invention embraces, may be used in the same state in which it is taken from the earth—viz., an impalpable dust or powder of silicious character; or it may be prepared for use in a manner which I will now describe.

One-half ounce of sal-ammoniac, (muriate of ammonia,) one-half pound of white vitriol, (sulphate of zinc,) one ounce of gum-arabic, and half a gill of gum-tragacanth, dissolved in water, are put into two quarts of water and stirred until the whole is dissolved. Six pounds of silicious marl are then well stirred up in the solution; and if it is proposed to give the material any shade of color or dye, the requisite coloring-matter can be put in it at this point, the whole mass being well mixed up together. A pint and a half of linseed-oil is also thoroughly stirred up in it.

A chemical affinity is produced by the mixture of these ingredients, the bases and salts contained uniting the oil, water, and marl; and the preparation thus obtained proves a most effective agent for the purposes of the cabinet-maker, producing a more perfect polish upon the surface of wood, and being more easily and conveniently applied than any other material for this object in use.

The advantages obtained by the use of this substance are very important, especially to manufacturers on a large scale, when cheapness of material in an agent so extensively used as this class to which my invention belongs makes such a vast difference in the profits of the trade. This earth being often found in large quantities, and then the superior qualities it has in polishing and filling wood, render it of great value to the cabinet-maker, carriage-maker, and others in similar occupations.

Now, having described my invention, what I claim as new, and desire to secure by Letters Patent, is—

1. The use of silicious marl, or infusorial earth, for the purpose of filling and polishing wood, substantially as herein set forth.

2. The combination of silicious marl with any or all of the substances herein named—sulphate of zinc, muriate of ammonia, gum-arabic, gum-tragacanth, and oil—substantially in the manner and for the purpose herein set forth.

JAMES PERRY.

Witnesses:
S. B. FELLER,
C. S. VAN SLIKE.